(12) United States Patent
Inoue

(10) Patent No.: US 7,296,560 B2
(45) Date of Patent: Nov. 20, 2007

(54) ENGINE OF SPARK-IGNITION TYPE (75) Inventor: Hiroshi Inoue, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 11/206,894

(22) Filed: Aug. 18, 2005

(65) Prior Publication Data

US 2006/0157033 A1 Jul. 20, 2006

(30) Foreign Application Priority Data

Jan. 20, 2005 (JP) ............... 2005-012549

(51) Int. Cl.
F02M 61/14 (2006.01)
F02D 41/34 (2006.01)

(52) U.S. Cl. .................. 123/470; 123/336; 123/73 AD (58) Field of Classification Search ................ 123/337, 123/470, 472, 73 AD, 73 C, 298, 301, 305, 123/347–348, 342, 90.15, 336
See application file for complete search history.

(56) References Cited

U.S. PATENT DOCUMENTS

| 2,995,123 | A | * | 8/1961 | Goschel | ...................... | 123/470 |
|---|---|---|---|---|---|---|
| 5,255,654 | A | * | 10/1993 | Karlsson | ...................... | 123/403 |
| 5,477,830 | A | * | 12/1995 | Beck et al. | .................. | 123/470 |
| 5,758,623 | A | * | 6/1998 | Nitta et al. | .................. | 123/470 |
| 6,354,284 | B1 | | 3/2002 | Nakano et al. | | |
| 6,637,386 | B2 | * | 10/2003 | Murata et al. | ........... | 123/90.15 |
| 6,718,755 | B2 | * | 4/2004 | Brehob | ........................ | 60/284 |
| 6,718,936 | B2 | * | 4/2004 | Matsuda | ................. | 123/196 R |
| 6,785,603 | B2 | * | 8/2004 | Inoue | ........................ | 701/112 |
| 7,025,046 | B2 | * | 4/2006 | Ikeda et al. | ................. | 123/470 |
| 2005/0263118 | A1 | * | 12/2005 | Nakai et al. | ............. | 123/90.15 |

FOREIGN PATENT DOCUMENTS

JP 2003-278627 A 10/2003

* cited by examiner

Primary Examiner—Hai Huynh
(74) Attorney, Agent, or Firm—Akin Gump Strauss Hauer & Feld LLP (57) ABSTRACT An engine of spark-ignition type injects fuel from an injector (3) into an intake port (2) provided in a cylinder head (1). In this engine of spark-ignition type, the injector (3) has fuel injection holes oriented toward an inner wall surface of the intake port (2) and makes a start (3a) of the fuel injection during an exhaust stroke of each of cylinders (5) and (6). The injected fuel is adapted to collide against the inner wall surface of the intake port (2). Preferably, the start (3a) of the fuel injection is made at a later half portion of the exhaust stroke of each of the cylinders (5) and (6). More preferably, the start (3a) is made during a term of 31 degrees to 25 degrees of a crank angle before the end of the exhaust stroke.

13 Claims, 6 Drawing Sheets

ENGINE OF SPARK-IGNITION TYPE

BACKGROUND OF THE INVENTION

1. Technical Field

The present invention relates to an engine of spark-ignition type and more particularly to an engine of spark-ignition type which can accelerate the gasification of the injected fuel.

An example of the conventional engines of spark-ignition type injects fuel from an injector into an intake port provided in a cylinder head, as well as the present invention.

The engine of this type has an advantage that it can obtain a mixture air of air-fuel ratio more precise than a carburetor, an excellent exhaust gas property and an output property.

However, the conventional engine directs a fuel injection hole of an injector to an intake valve port and starts the fuel injection during an intake stroke of a cylinder. The injected fuel passes through the intake valve port together with intake air and is flowed into a combustion chamber.

The above-mentioned conventional technique has the following problem.

<Problem> The injected fuel is apt to insufficiently gasify.

There is no room for the injected fuel to absorb heat within the intake port. Therefore, it gasifies insufficiently. This makes it difficult to attempt to improve each of the exhaust gas property, output property, fuel consumption property, and the like.

SUMMARY OF THE INVENTION

The present invention has an object to provide an engine of spark-ignition type able to solve the above-mentioned problem. More particularly, it aims at providing an engine of spark-ignition type which can accelerate the gasification of the injected fuel.

The characterizing matter of the invention as set forth in claim 1 is as follows.

Figure 1:
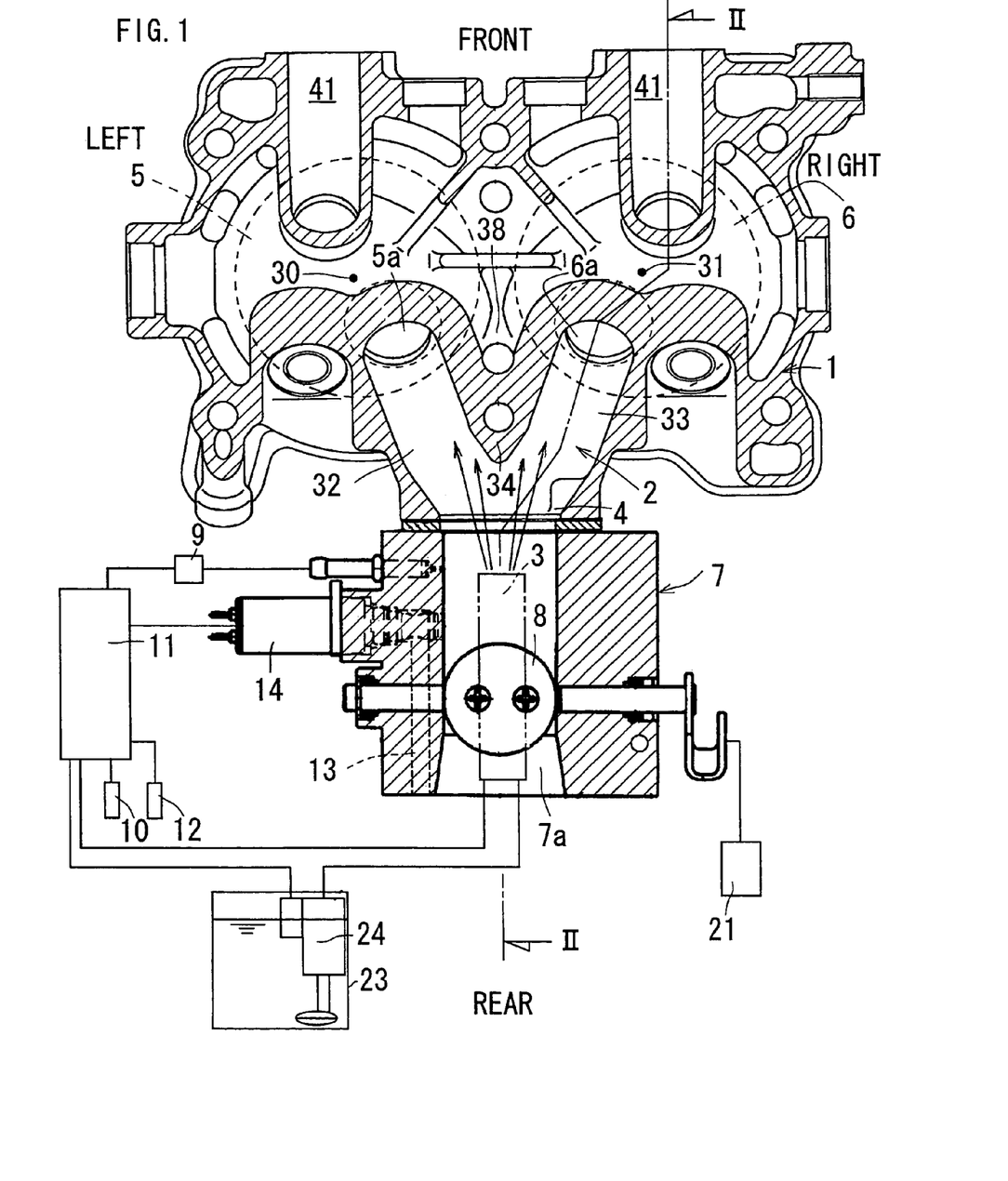
FIG. 1 is a plan view, in cross section, showing a cylinder head of an engine according to an embodiment of the present invention and its surroundings.

As exemplified in FIG. 1, an engine of spark-ignition type has a cylinder head 1 provided with an intake port 2, into which fuel is injected from an injector 3. This engine of spark-ignition type, as shown in FIG. 1, FIGS. 2(A) and 2(B), FIG. 5, FIG. 6, and FIG. 7, is characterized in that the injector 3 has fuel injection holes 35 and 36 directed to an inner wall surface of the intake port 2 and a start 3a of the fuel injection is made during an exhaust stroke of each of cylinders 5 and 6, and that the injected fuel collides against the inner wall surface of the intake port 2.

EFFECTS OF THE INVENTION (Invention of Claim 1)

As exemplified in FIG. 1, FIG. 2(A), FIG. 6 and FIG. 7, the injected fuel collides against the inner wall surface of the intake port 2. Therefore, the fuel contacts the collision portion and spreads over the surroundings of the collision portion to receive the heat of the inner wall surface of the intake port 2 with the result of accelerating its gasification. The present invention, as shown in FIG. 2(B), makes the start 3a of the fuel injection during the exhaust stroke. Accordingly, when compared with the case where the start of the fuel injection is made during an intake stroke, it can increase the time for gasification to result in being advantageous to the gasification. Further, during the exhaust stroke, the compression heat, combustion heat and exhaust heat are stored in the inner wall surface of the intake port 2 via a compression stroke, an explosion stroke and the exhaust stroke, so that the inner wall surface of the intake port 2 has a high temperature. This point is also advantageous to the gasification.

(Invention of Claim 2)

It offers the following effect in addition to the effect presented by the invention of claim 1.

<Effect> It is advantageous to the gasification of the injected fuel.

As illustrated in FIG. 2(B), the start 3a of the fuel injection is made at a later half portion of the exhaust stroke. This is advantageous because the exhaust heat is stored at the inner wall surface of the intake port 2 at the later half portion of the exhaust stroke for a longer period of time than at an earlier half portion of the exhaust stroke.

(Invention of Claim 3)

It offers the following function and effect in addition to the effect presented by claim 2.

<Effect> It is advantageous to the gasification of the injected fuel.

As exemplified in FIG. 2(B), the start 3a of the fuel injection is made during a term of 31 degrees to 25 degrees of crank angle before the end of the exhaust stroke. This is advantageous to the gasification of the injected fuel. When the start of the fuel injection is made prior to 31 degrees of crank angle before the end of the exhaust stroke, the exhaust heat is stored in the inner wall surface of the intake port 2 for a relatively short period of time to result in failing to sufficiently increase the temperature of the inner wall surface of the intake port 2. This entails a likelihood that the fuel gasifies insufficiently. Further, if the start of the fuel injection is made after 25 degrees of crank angle before the end of the exhaust stroke, the time for fuel gasification becomes so short that the fuel is likely to gasify insufficiently. On the other hand, when the start 3a of the fuel injection is made during the term of 31 degrees to 25 degrees of crank angle before the end of the exhaust stroke, the above-mentioned likelihoods are not caused, so that it is advantageous to the gasification of the injected fuel.

(Invention of Claim 4)

It offers the following function and effect in addition to those presented by the invention as set forth in any one of claims 1 to 3.

<Effect> It is possible to reduce the number of parts.

Figure 6:
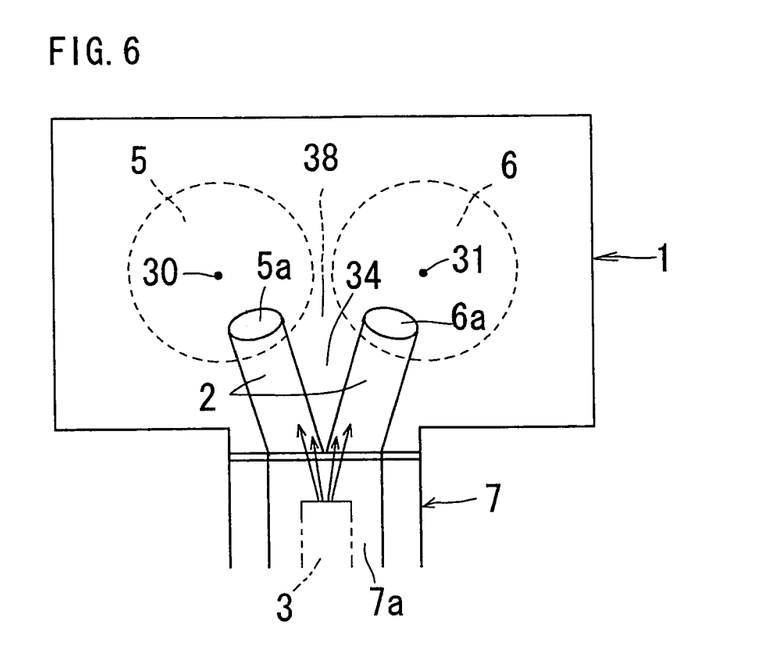
FIG. 6 is a schematic view of a first modification of the embodiment according to the present invention and is similar to FIG. 1.
Figure 7:
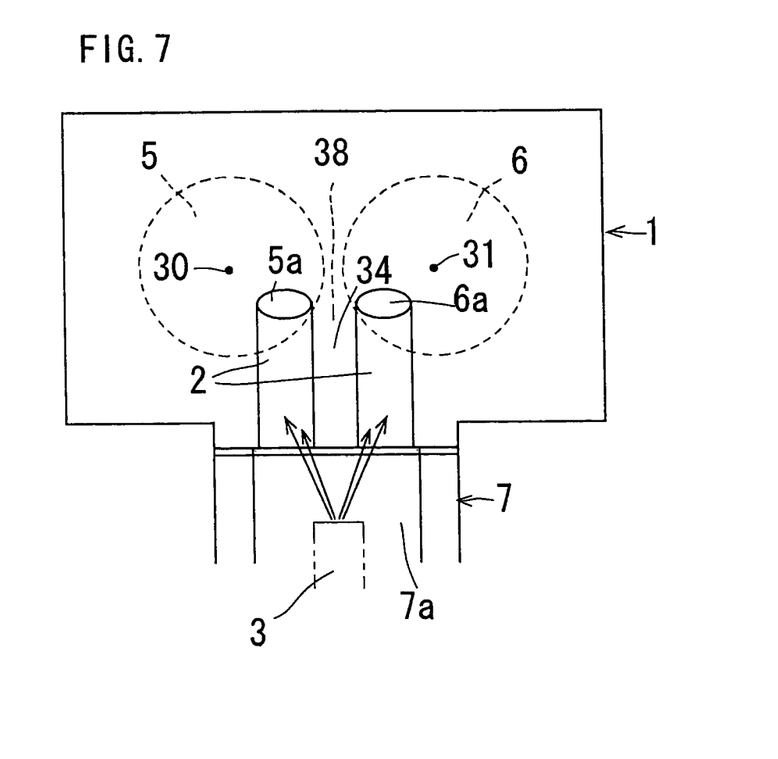
FIG. 7 is a schematic view of a second modification of the embodiment according to the present invention and is similar to FIG. 1.

As exemplified in FIGS. 1, 6 and 7, one throttle body 7 is used for a pair of left and right adjacent cylinders 5 and 6. Therefore, the number of throttle bodies 7 is sufficient even if it is half the number of cylinders. This can reduce the number of parts.

(Invention of Claim 5)

It offers the following function and effect in addition to those presented by the invention of claim 4.

<Effect> It is possible to prevent the gasification of the fuel within the injector.

As shown in FIGS. 1, 2(A), 6 and 7, the injector 3 is attached to the throttle body 7. Consequently, when compared with the case where the injector is attached to the cylinder head, it is possible to inhibit the entrance of heat from the cylinder head 1 to the injector 3, which leads to the possibility of preventing the gasification of the fuel within the injector 3.

(Invention of Claim 6)

It offers the following effect in addition to the effect presented by claim 4 or claim 5.

<Effect> It is possible to reduce the number of parts.

As exemplified in FIGS. 1, 6 and 7, one injector 3 is employed for one throttle body 7. Therefore, the number of injectors 3 is sufficient even if it is half the number of cylinders. Thus it is possible to reduce the number of parts.

(Invention of Claim 7)

It offers the following effect in addition to the effect presented by the invention of claim 6.

<Effect> It is possible to distribute fuel of equal amount to the left and right cylinders accurately.

As exemplified in FIGS. 1, 5, 6 and 7, the fuel injected separately in the left and right directions from the left and right fuel injection holes 35 and 36 is made to respectively collide against the inner wall surfaces of the intake port 2 on the left and right sides of a central intake port wall 34. Accordingly, when compared with the case where the fuel injected from a single fuel injection hole is made to collide against the central intake port wall, thereby dividing it in the left and right directions, it is possible to precisely distribute the fuel of equal amount to the left and right cylinders 5 and 6.

(Invention of Claim 8)

It offers the following effect in addition to the effect presented by the invention of claim 7.

<Effect> It is advantageous to the gasification of the injected fuel.

As shown in FIGS. 1, 2(A), 6, and 7, the fuel injected simultaneously and separately in the front and rear directions is made to respectively collide against the inner wall surfaces of the intake port 2 as staggered in the front and rear direction on the left and right sides of the central intake port wall 34. Thus the injected fuel spreads over a wide area at the inner wall surface of the intake port 2 in the front and rear direction. This becomes advantageous to the gasification of the injected fuel.

(Invention of Claim 9)

It offers the following effect in addition to the effect presented by claim 7 or claim 8.

<Effect> It is possible to simplify the structure of the injector and the control of the injection.

As illustrated in FIGS. 1, 6 and 7, the fuel is simultaneously injected from the left and right fuel injection holes 35 and 36. Therefore, when compared with the case where the fuel is injected at different times, it is possible to simplify the structure of the injector 3 and the control of the injection.

(Invention of Claim 10)

It offers the effect in addition to the effect presented by the invention of claim 9.

<Effect> It is advantageous to the gasification of the injected fuel.

As exemplified in FIG. 2(B), the start 3a of the fuel injection is made respectively in one cycle during two times of synchronizing period in which the compression stroke of one cylinder synchronizes with the exhaust stroke of the other cylinder. This is advantageous to the gasification of the injected fuel because during this synchronizing period, the compression heat, combustion heat and exhaust heat are stored at the inner wall surface of the intake port 2 via the compression stroke, explosion stroke and exhaust stroke from the one cylinder and the compression heat during the compression stroke is transmitted to the inner wall surface from the other cylinder to thereby increase the temperature of the inner wall surface of the intake port.

(Invention of Claim 11)

It offers the following effect in addition to the effect presented by the invention of claim 10.

<Effect> It is possible to make the condition of the fuel distributed to the left and right cylinders uniform.

As exemplified in FIG. 2(B), the start 3a of the fuel injection which is made twice in one cycle is substantially effected by a phase difference of 360 degrees of crank angle. This can make the condition of the fuel distributed to the left and right cylinders 5 and 6 uniform. Should this phase difference be shifted from 360 degrees, during one cycle, the crank angle from the first start 3a of the fuel injection to the start of the intake stroke of one cylinder becomes distinct from the crank angle from the second start 3a of the fuel injection to the start of the intake stroke of the other cylinder. Thus it becomes difficult to make the condition of the fuel distributed to the left and right cylinders 5 and 6 uniform.

(Invention of Claim 12)

It offers the following effect in addition to the effect presented by the invention as set forth in any one of claims 4 to 11.

<Effect> It is possible to reduce a width in the left and right direction of the throttle body.

As exemplified in FIGS. 1 and 6, the central intake port wall 34 has its width in the left and right direction progressively decreased as it approaches a throttle intake passage 7a. When compared with the case where the width in the left and right direction is constant, it is possible to reduce the width in the left and right direction of the throttle body 7.

(Invention of Claim 13)

It offers the following effect in addition to the effect presented by the invention of claim 12.

<Effect. It is advantageous to the gasification of the injected fuel.

As exemplified in FIG. 1, the intake port 2 is formed into a branched structure that it is directed from one intake port inlet 4 to the respective intake valve ports 5a and 6a of the mutually adjoining left and right cylinders 5 and 6. Therefore, when compared with the case where the intake port 2 is divided to left and right portions by the central intake port wall 34 as shown in FIGS. 6. and 7, the intake port 2 formed on both sides of the central intake port 34 approaches an inter-cylinder portion 38 of a high temperature. Thus the inner wall surface of the intake port 2 has a high temperature. This is advantageous to the gasification of the injected fuel.

(Invention of Claim 14)

It offers the following effect in addition to the effect presented by any one of the inventions as set forth in claims 1 to 13.

<Effect> It is possible to produce the engine at a low cost.

As exemplified in FIG. 1, a throttle valve 8 is interlockingly connected to a mechanical governor. A control means 11 adjusts the fuel injection from the injector 3 based on the intake air pressure detected by an intake air pressure sensor 9 and the number of engine rotations detected by an engine rotation-number sensor 10. Accordingly, without using the electronic governor, the air-flow sensor and the like expensive electronic parts, it is possible to inject the fuel depending on the intake air amount with the result of being able to produce the engine at a low cost.

(Invention of Claim 15)

It offers the effect in addition to the effect presented by the invention of claim 14.

<Effect> It is possible to stabilize the idling rotation when it is cold.

As shown in FIG. 1, in the event that the engine has a temperature lower than a predetermined value, the control means 11 opens a bypass valve 14. Therefore, it is possible to stabilize the idling rotation when it is cold. When it is cold, the rotation resistance becomes large because the viscosity of the engine oil becomes high or for the like reason, which results in readily making the idling rotation unstable. However, according to the present invention, the bypass valve 14 is opened when it is cold. This increases the fuel injection amount by the amount of the intake air supplemented through the intake bypass passage 13. The fuel of the thus increased amount can be promptly gasified with the heat of the inner wall surface of the intake port 2. In consequence, it is possible to stabilize the idling rotation when it is cold.

(Invention of Claim 16)

It offers the following effect in addition to the effect presented by claim 14 or claim 15.

<Effect> It is possible to inhibit the engine stall.

As exemplified in FIG. 1, in the event that a reduction speed of the intake air pressure detected by the intake air pressure sensor 9 is larger than a predetermined value, the control means 11 controls the bypass valve 14 so that it opens for a predetermined period of time. Thus it is possible to inhibit the engine stall. In the case of using the mechanical governor, when the load is rapidly reduced or the like, the throttle valve 8 is overshot toward the valve-closing side to result in the shortage of the intake air amount. This leads to the insufficiency of the mixture air, which entails a likelihood of causing the engine stall. However, according to the present invention, the detection of the reduction speed of the intake air pressure senses the omen of the above-mentioned overshooting and then keeps the intake bypass passage 8 open since a point of time prior to the overshooting of the throttle valve 8, thereby preventing the shortage of the intake air amount upon overshooting with the result of being able to inhibit the engine stall.

(Invention of Claim 17)

It offers the following effect in addition to the effect presented by the invention of claim 16.

<Effect> It is possible to enhance the function of inhibiting the engine stall.

The larger the reduction speed of the intake air pressure, the longer the opening time of the bypass valve 14 is made. This can enhance the function of inhibiting the engine stall. The larger the reduction speed of the intake air pressure, the larger the degree of the overshooting toward the valve-opening side of the throttle valve 8 to result in delaying the return of the throttle valve 8 to an adequate degree of opening, in the aspect of time. This readily causes the engine stall. Therefore, the present invention elongates the opening time of the bypass valve 14 as the reduction speed becomes larger to thereby enhance the function of inhibiting the engine stall.

<Effect>. It is possible to decrease the fuel consumption.

The smaller the reduction speed of the intake air pressure, the shorter the opening time of the bypass valve 14 is made. Accordingly, the fuel is supplied without wasting it with the result of being able to decrease the fuel consumption.

DETAILED DESCRIPTION OF THE EMBODIMENTS

An embodiment of the present invention is explained based on the drawings. FIGS. 1 to 5 show an engine of spark-ignition type according to the embodiment of the present invention. In this embodiment, an explanation is given for a water-cooled vertical two-cylinder gasoline engine of spark-ignition type.

The embodiment of the present invention is outlined as follows.

Figure 4:
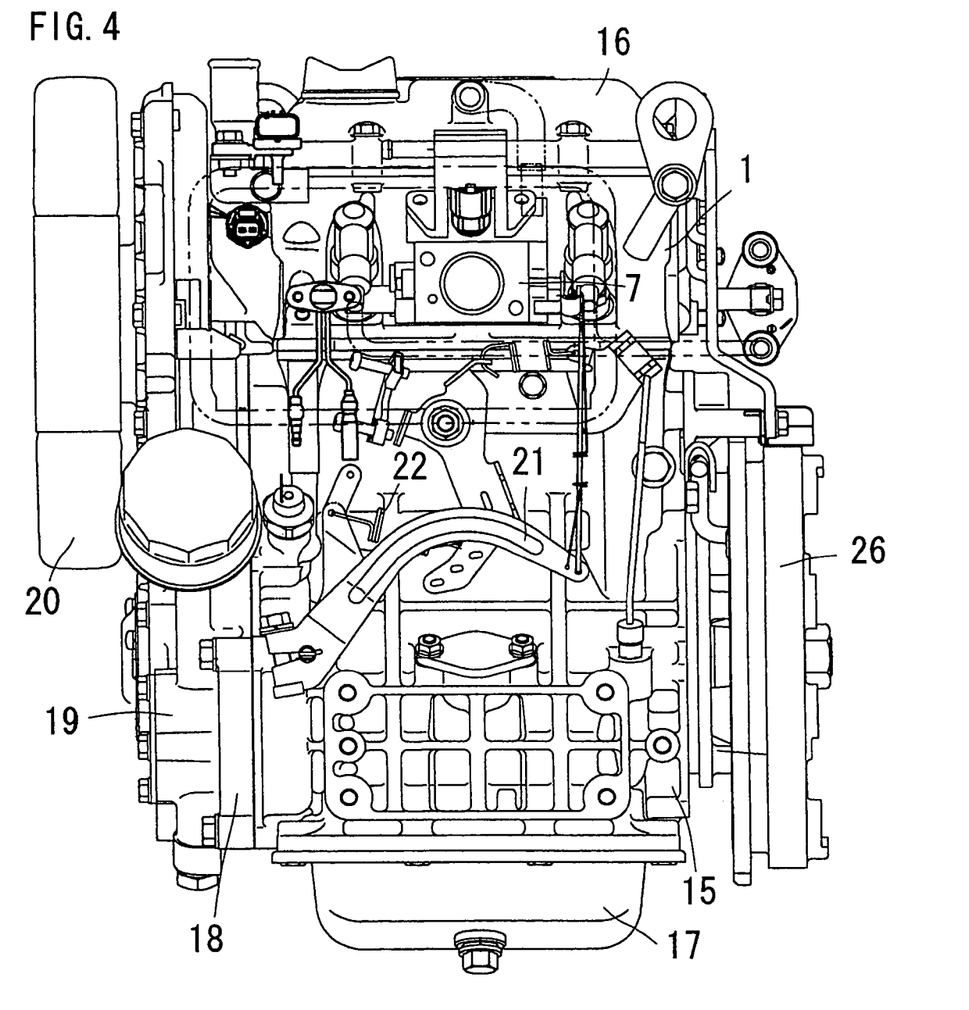
FIG. 4 is a view showing an outer appearance of the engine shown in FIG. 3.

As shown in FIG. 4, a cylinder head 1 is assembled to an upper portion of a cylinder block 15. A head cover 16 is assembled to an upper portion of the cylinder head 1. An oil pan 17 is assembled to a lower portion of the cylinder block 15. A gear case 18 is assembled to a left portion of the cylinder block 15. A belt case 19 is assembled to a left portion of the gear case 18. A cooling fan 20 is arranged at a left portion of the belt case 19. A flywheel 26 is disposed at a right portion of the cylinder block 15. A throttle body 7 is assembled to a rear portion of the cylinder head 1. A governor lever 21 and a governor spring 22 of a mechanical governor are arranged along a wall surface of the cylinder block 15. This engine is provided with an electronic fuel injection device.

The electronic fuel injection device of this engine is outlined as follows.

As shown in FIG. 1, fuel is injected from an injector 3 into an intake port 2 provided in the cylinder head 1. Attached to the throttle body 7 are a throttle valve 8 and the injector 3. The throttle valve 8 is interlockingly connected to the governor lever 21 of the mechanical governor. There are provided an intake air pressure sensor 9 which detects the intake air pressure intake-downstream of the throttle valve 8, a sensor 10 which detects the number of engine rotations and a control means 11. The sensor 9 and the sensor 10 are associated with the injector 3 through the control means 11. Depending on the intake air amount calculated based on the intake air pressure detected by the sensor 9 and the number of engine rotations detected by the sensor 10, the control means 11 adjusts the fuel injection amount from the injector 3. As for the fuel, gasoline is used. But other liquid fuel and liquefied gas fuel can be employed. The liquid fuel is the fuel that is liquid at an ordinary temperature under the normal pressure (15 degrees C. to 20 degrees C., and 760 mmHg). The liquefied fuel is the fuel that is gaseous at the ordinary temperature under the normal pressure but is liquid when pressurized. This invention aims at accelerating the gasification of the fuel. Therefore, its effect remarkably appears when using the liquefied fuel which hardly gasifies after the fuel injection, rather than the gaseous fuel which easily gasifies after the fuel injection.

The details of the electronic injection device are as follows.

Figure 2A:
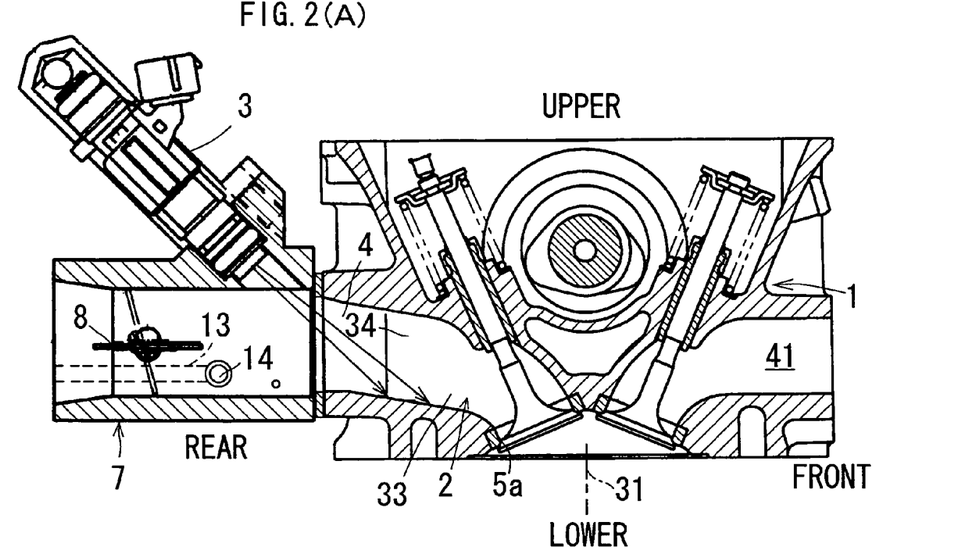
FIG. 2(A) is a sectional view taken along a line II—II in FIG. 1.
Figure 2B:
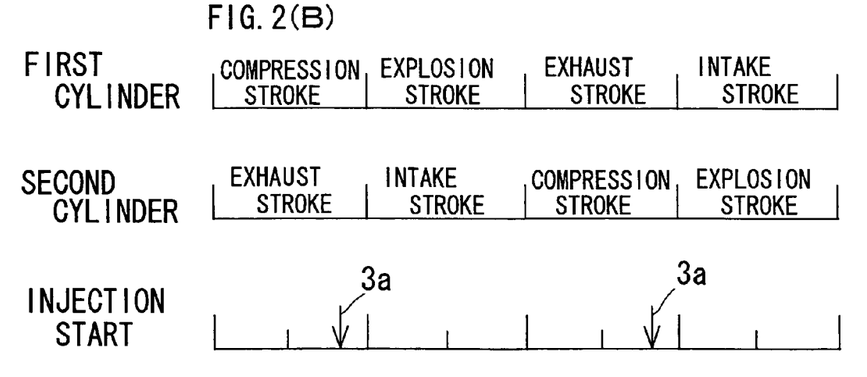
FIG. 2(B) is a view explaining the time for making a start of the fuel injection.

As shown in FIG. 2(A), the injector 3 is attached to an upper portion of the throttle body 7. Further, as shown in FIG. 1, the injector 3 is connected to a pump 24 for delivering fuel under pressure, provided in a fuel container 23. Thus the fuel is sent under pressure through the pump 24 from the fuel container 23 to the injector 3. And the control means 11 controls the fuel injection term from the injector 3 so as to adjust the fuel injection amount. The control means 11 is a microcomputer. The control means 11 makes a control at the ignition time as well.

The electronic injection device is devised as follows.

As shown in FIGS. 1, 2(A), 2(B), and 5, the injector 3 has fuel injection holes 35 and 36 oriented toward an inner wall surface of the intake port 2. A start 3a of the fuel injection is made during exhaust strokes of the cylinders 5 and 6. The injected fuel collides against the inner wall surface of the intake port 2.

As shown in FIG. 1, when seen in a direction parallel to cylinder center axes 30 and 31, on the assumption that a direction where the two cylinders 5 and 6 are arranged is taken as a left and right direction, and a widthwise direction of the cylinder head 1 rectangular to this left and right direction is deemed as a front and rear direction optional one of which is regarded as a rear direction, one throttle body 7 is utilized for a pair of adjacent left and right cylinders 5 and 6. This throttle body 7 is arranged rearwardly of the cylinder head 1 and is provided with one throttle intake passage 7a and one throttle valve 8. A central intake port wall 34 is conducted from between the respective intake valve ports 5a and 6a of the left and right cylinders 5 and 6 toward the throttle intake passage 7a. The respective valve ports 5a and 6a are communicated with the throttle intake passage 7a through the intake port 2 formed on the left and right sides of the central intake port wall 34.

Figure 5:
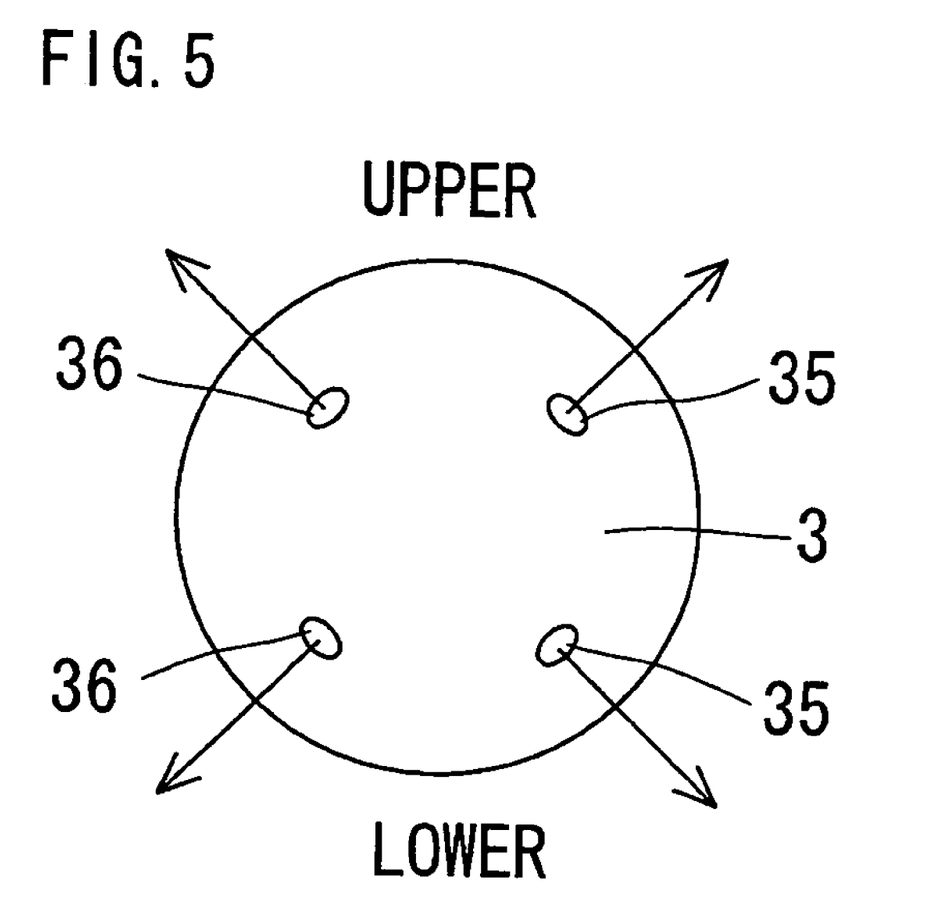
FIG. 5 is a front view of a front end of an injector to be used in the engine shown in FIG. 1.

As shown in FIGS. 1 and 2(A), the injector 3 is attached to the throttle body 7. One injector 3 is used for one throttle body 7. As shown in FIG. 1, the injector 3 has its front end portion directed toward the central intake port wall 34 ahead thereof. The left and right fuel injection holes 35 and 36 are arranged at this front end portion of the injector 3. The fuel injected from these left and right fuel injection holes 35 and 36 separately in the left and right directions are adapted to respectively collide against the inner wall surfaces of the intake port 2 on the left and right sides of the central intake port wall 34. As shown in FIG. 5, the left and right fuel injection holes 35 and 36 are paired and two pairs of these left and right fuel injection holes are arranged at the front end portion of the injector 3. As shown in FIGS. 1 and 2(A), the fuel injected simultaneously and separately in the front and rear directions from these two pairs is adapted to respectively collide against the inner wall surfaces of the intake port 2 as staggered in the front and rear direction on the left and right sides of the central intake port wall 34.

Further, the fuel is injected simultaneously from the left and right fuel injection holes 35 and 36.

As shown in FIG. 2(A), a direction of cylinder center axes 30 and 31 is taken as an upper and lower direction. Assuming that the side where the head cover 16 is present is regarded as an upper side and the side where the cylinder block 15 exists is a lower side, when seen in a direction parallel to a direction where a crank shaft 37 spans, the fuel to be injected is injected obliquely downwards through an intake port inlet 4 to the intake port 2 and collides against a lower portion of the inner wall surface of the intake port 2 from an obliquely upper side. In FIGS. 1, 2(A) and 5, the directions of the fuel injection are indicated by arrows. In FIGS. 1 and 2(A), the fuel collides against the inner wall surface of the intake port 2 at leading end positions of the arrows.

As shown in FIG. 1, the central intake port wall 34 has its width in the left and right direction progressively decreased as it approaches the throttle intake passage 7a. The intake port 2 is formed into a branched structure that it is directed from the single intake port inlet 4 toward the respective intake valve ports 5a and 6a of the mutually adjoining left and right cylinders 5 and 6. And the fuel injected simultaneously and separately in the left and right directions from the left and right fuel injection holes 35 and 36 respectively collides against the inner wall surfaces of the left and right branched port portions 32 and 33 on the left and right sides of the central intake port wall 34 as shown in FIG. 1. This engine has two cylinders and the intake port 2 is branched, so that it is not necessary to use the intake manifold.

The details of the injection start time are as follows.

Figure 3:
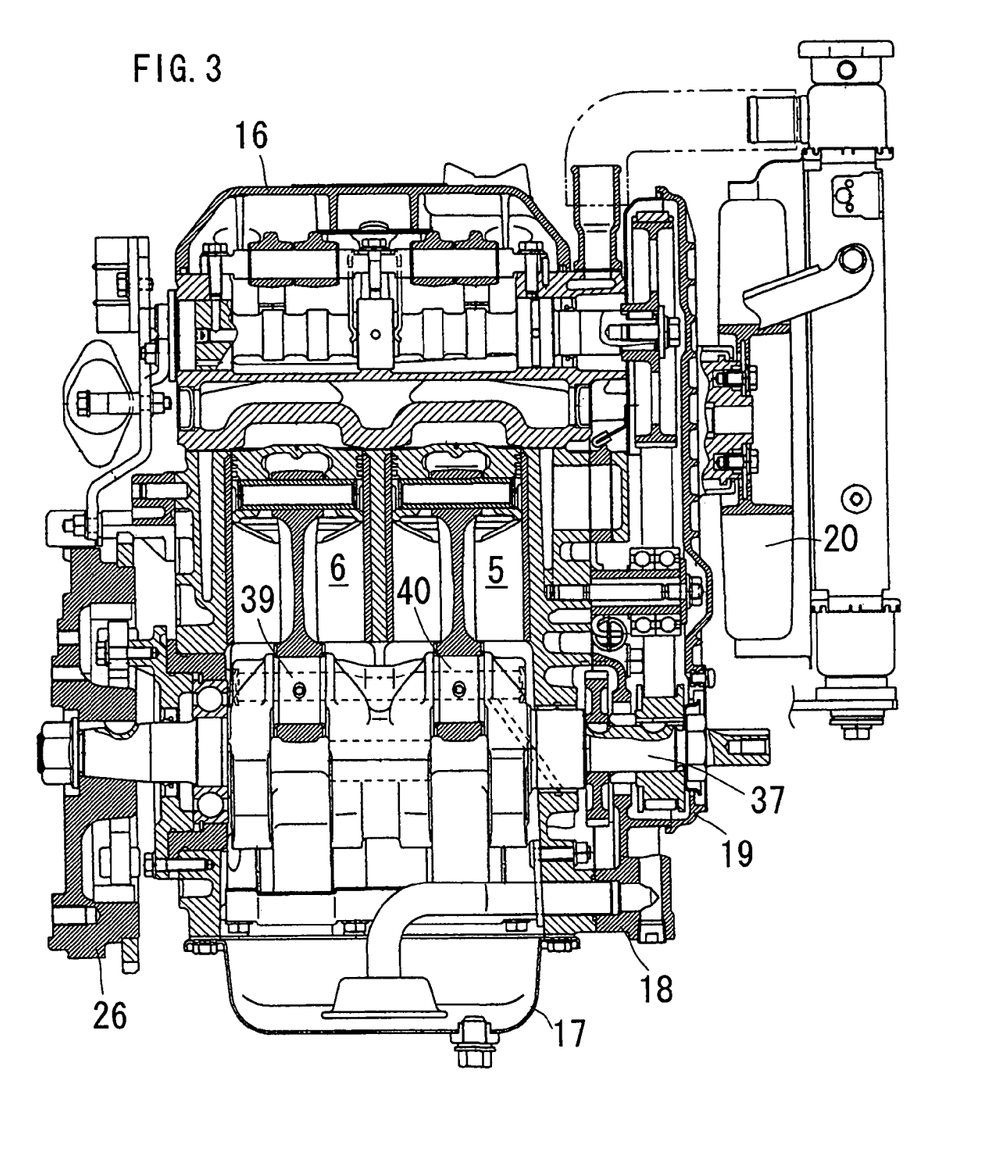
FIG. 3 is a vertical sectional view of the engine according to the embodiment of the present invention.

As shown in FIG. 2(B), this engine is of four-cycle and has two cylinders arranged in series. With an angle of a crank pin taken as 360 degrees, in one cycle, during two times of synchronizing period in which a compression stroke of one cylinder synchronizes with an exhaust stroke of the other cylinder, the respective starts 3a of the fuel injection are made. More specifically, as shown in FIG. 2(B), during a period of time in which the first cylinder 5 is at the compression stroke and the second cylinder 6 is at the exhaust stroke, the start 3a of the fuel injection is made from the injector 3 toward the inner wall surface of the intake port 2. Further, on the contrary, during a period of time where the second cylinder 6 is at the compression stroke and the first cylinder 5 is at the exhaust stroke, the start (3a) of the fuel injection is also made from the injector 3 toward the inner wall surface of the intake port 2. The control means 11 controls the stating time of the fuel injection. In FIG. 3 numerals 39 and 40 designate the crank pins.

Concretely, as shown in FIG. 2(B), during the term in which the first cylinder 5 is at a later half portion of the compression stroke and the second cylinder 6 is at a later half portion of the exhaust stroke, the start 3a of the fuel injection is made from the injector 3. Besides, during the term in which the second cylinder 6 is at a later half portion of the compression stroke and the first cylinder 5 is at a later half portion of the exhaust stroke, the start 3a of the fuel injection is made from the injector 3.

Preferably, the start 3a of the fuel injection is made during the term in which the first cylinder 5 is at 31 degrees to 25 degrees of crank angle before the end of the compression strok and the second cylinder 6 is at 31 degrees to 25 degrees of crank angle before the end of the exhaust stroke. In addition, the start 3a of the fuel injection is made from the injector 3 during the term in which the second cylinder 6 is at 31 degrees to 25 degrees of crank angle before the end of the compression stroke and the first cylinder 5 is at 31 degrees to 25 degrees of crank angle before the end of the exhaust stroke. At the time earlier than this term, there is a likelihood that the amount of the heat stored at the cylinder head 1 becomes insufficient. At the time later than this term, there is a fear that the time for gasifying the fuel becomes short.

The start 3a of the fuel injection made twice in one cycle is substantially effected by the phase difference of 360 degrees of crank angle. The control means 11 adjust the time for making the start 3a of the fuel injection based on the intake air pressure detected by the sensor 9 and the number of engine rotations detected by the sensor 10, as well as the fuel injection amount.

The other devises are as follows.

As shown in FIG. 1, there are provided an engine temperature detecting means 12, an intake bypass passage 13 which communicates an intake-upstream side of the throttle valve 8 with an intake-downstream side thereof, and a bypass valve 14 for opening and closing this intake bypass passage 13. The engine temperature detecting means 12 is associated with the bypass valve 14 through the control means 11. If the engine temperature is lower than a predetermined value, the control means 11 opens the bypass valve 14. A cooling-water temperature sensor is utilized for the engine temperature detecting means 12. But instead of this cooling-water temperature sensor, an engine temperature sensor may be employed.

Further, in the event that the reduction speed of the intake air pressure detected by the sensor 9 is higher than a predetermined value, the control means 11 controls the bypass valve 14 so that it opens for a predetermined period of time. In the case where the reduction speed of the intake air pressure detected by the sensor 9 is higher than the predetermined value, the control means 11 controls the bypass valve 14 so that it opens for a longer period of time as the reduction speed of the intake air pressure becomes higher. If the reduction speed of the intake air pressure detected by the intake air pressure sensor 9 is lower than the predetermined value, the bypass valve 14 is kept closed except the case where the engine temperature is lower than a predetermined value. In FIGS. 1 and 2(A), numeral 41 indicates an exhaust port.

FIGS. 6 and 7 show a first and a second modifications of the embodiment, respectively.

In the first modification shown by FIG. 6, the central intake port wall 34 has its width in the left and right direction progressively decreased as it approaches the throttle intake passage 7a as well as that in FIG. 1. However, differently from that of FIG. 1, the intake port 2 is formed into not the branched structure but a separate structure that it is separated in the left and right direction with the central intake port wall 34 disposed therebetween.

In the second modification shown by FIG. 7, differently from that of FIG. 1, the central intake port wall 34 has a constant width in the left and right direction. The intake port 2 is formed into not the branched structure but the separate structure that it is separated in the left and right direction with the central intake port wall 34 interposed therebetween.

Each of these modifications has the same construction and function as those of the embodiment except the foregoing differences.

In FIGS. 6 and 7, the fuel is injected in the directions indicated by arrows and collides against the inner wall surface of the intake port 2 at the leading end positions of the arrows.

What is claimed is:

1. An engine of spark-ignition type which injects fuel from an injector (3) into an intake port (2) provided in a cylinder head (1), wherein the injector (3) has fuel injection holes (35), (36) oriented toward an inner wall surface of the intake port (2) and makes a start (3a) of the fuel injection during an exhaust stroke of each of cylinders (5) and (6), the injected fuel collides against the inner wall surface of the intake port (2), wherein when seen in a direction parallel to cylinder center axes (30), (31), on the assumption that a direction where the cylinders (5) and (6) are arranged is taken as a left and right direction, and a width direction of the cylinder head (1) perpendicular to this left and right direction is deemed as a front and rear direction optional one of which is regarded as a rear direction, one throttle body (7) is used for a pair of adjacent left and right cylinders (5) and (6) and is arranged rearwardly of the cylinder head (1). the throttle body (7) being provided with one throttle intake passage (7a) and one throttle valve (8), a central intake port wall (34) is conducted from between the respective valve ports (5a), (6a) of the left and right cylinders (5), (6) to the throttle intake passage (7a) and has left and right sides formed with the intake port (2), through which the respective valve ports (5a), (6a) are communicated with the throttle intake passage (7a), wherein the injector (3) is attached to the throttle body (7), wherein one injector (3) is utilized for one throttle body (7), and wherein the injector (3) has a front end portion directed toward the central intake port wall (34) ahead thereof and the left and right fuel injection holes (35), (36) are arranged at this front end portion of the injector (3), the fuel injected separately in the left and right directions from these left and right fuel injection holes (35), (36) being adapted to respectively collide against the inner wall surfaces of the intake port 2 on the left and right sides of the central intake port wall (34).

2. The engine of spark-ignition type as set forth in claim 1, wherein the start (3a) of the fuel injection is made during a later half portion of the exhaust stroke of each of the cylinders (5) and (6).

3. The engine of spark-ignition type as set forth in claim 2, wherein the start (3a) of the fuel injection is made during a term of 31 degrees to 25 degrees of crank angle before the end of the exhaust stroke.

4. The engine of spark-ignition type as set forth in claim 1, wherein the left and right fuel injection holes (35), (36) are paired, and plural pairs of fuel injection holes are arranged at the front end portion of the injector (3), the fuel injected separately in the front and rear directions and simultaneously from each of the plural pairs being adapted to respectively collide against the inner wall surfaces of the intake port (2) as staggered in the front and rear direction on the left and right sides of the central intake port wall (34).

5. The engine of spark-ignition type as set forth in claim 1, wherein the fuel is simultaneously injected from the left and right fuel injection holes (35), (36).

6. The engine of spark-ignition type as set forth in claim 5, wherein it is of four-cycle and has two cylinders arranged in series with an angle of a crank pin taken as 360 degrees, and makes the respective starts (3a) of the fuel injection in one cycle during two times of synchronizing period in which a compression stroke of one cylinder synchronizes with an exhaust stroke of the other cylinder.

7. The engine of spark-ignition type as set forth in claim 6, wherein the start (3a) of the fuel injection which is made twice in one cycle is substantially effected by a phase difference of 360 degrees of the crank angle.

8. The engine of spark-ignition type as set forth in claim 1, wherein the central intake port wall (34) has its width in the left and right direction progressively decreased as it approaches the throttle intake passage (7a).

9. The engine of spark-ignition type as set forth in claim 8, wherein the intake port (2) is formed into a branched structure that it is directed toward the respective intake valve ports (5a), (6a) of the mutually adjoining left and right cylinders (5), (6) from one intake port inlet (4).

10. The engine of spark-ignition type as set forth in claim 1, wherein disposed in an intake route is a throttle valve (8), which is interlockingly connected to a mechanical governor, and there are provided an intake air pressure sensor (9) which detects intake air pressure intake-downstream of the throttle valve (8), an engine rotation-number sensor (10) and a control means (11), the intake air pressure sensor (9) and the engine rotation-number sensor (10) being associated with the injector (3) through the control means (11), the control means (11) adjusting the fuel injection amount from the injector (3) based on the intake air pressure detected by the sensor (9) and the number of engine rotations detected by the sensor (10).

11. The engine of spark-ignition type as set forth in claim 10, wherein there are provided an engine temperature detecting means (12), an intake bypass passage (13) which communicates the intake-upstream side of the throttle valve (8) with the intake-downstream side thereof, and a bypass valve (14) which opens and closes this intake bypass passage (13), the engine temperature detecting means (12) being associated with the bypass valve (14) through the control means (11), and if the engine temperature is lower than a predetermined value, the bypass valve (14) opens.

12. The engine of spark-ignition type as set forth in claim 10, wherein there are provided the intake bypass passage (13), which communicates the upstream side of the throttle valve (8) with the downstream side thereof, and the bypass valve (14) which opens and closes this intake bypass passage (13), this bypass valve (14) being associated with the control means (11), and if a reduction speed of the intake air pressure detected by the intake air pressure sensor (9) is higher than a predetermined value, the control means (11) controlling the bypass valve (14) 50 that it opens for a predetermined period of time.

13. The engine of spark-ignition type as set forth in claim 12, wherein when the reduction speed of the intake air pressure detected by the intake air pressure sensor (9) is higher than the predetermined value, the control means (11) controls the bypass valve (14) so that it opens for a longer period of time as the reduction speed of the intake air pressure becomes higher.

* * * * *